US006241894B1

(12) United States Patent
Briggs et al.

(10) Patent No.: US 6,241,894 B1
(45) **Date of Patent: *Jun. 5, 2001**

(54) HIGH GRADIENT MAGNETIC DEVICE AND METHOD FOR CELL SEPARATION OR PURIFICATION

(75) Inventors: Donald David Briggs, Scotts Valley; Srikanth Ranga Chary, Fremont; Shang-Chih David Jen, Mountain View; Richard Merrill Schwartz, San Mateo, all of CA (US)

(73) Assignee: Systemix, Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/948,357

(22) Filed: Oct. 10, 1997

(51) Int. Cl.[7] .................................................. B01D 35/06
(52) U.S. Cl. .......................................... 210/695; 210/222
(58) Field of Search .................................. 210/222, 695; 209/213, 214, 223.1, 223.2; 422/101; 435/2, 7.23; 436/526

(56) References Cited

U.S. PATENT DOCUMENTS

| | | | | |
|---|---|---|---|---|
| 4,212,651 | * | 7/1980 | Eissenberg et al. . | |
| 4,387,286 | | 6/1983 | Inoue | 219/69 D |
| 4,560,484 | * | 12/1985 | Friedlaender et al. | 210/796 |
| 4,710,472 | * | 12/1987 | Saur et al. . | |
| 4,743,364 | | 5/1988 | Kyrazis | 209/212 |
| 4,795,698 | * | 1/1989 | Owen et al. . | |
| 5,081,030 | * | 1/1992 | Civin . | |
| 5,385,707 | | 1/1995 | Miltenyi et al. | 422/69 |
| 5,411,863 | | 5/1995 | Miltenyi et al. | 435/6 |
| 5,466,574 | | 11/1995 | Liberti et al. | 435/5 |
| 5,498,550 | * | 3/1996 | Fujiwara et al. . | |
| 5,512,332 | * | 4/1996 | Liberti et al. . | |
| 5,514,340 | * | 5/1996 | Lansdorf et al. . | |
| 5,520,158 | * | 5/1996 | Williamson . | |
| 5,536,475 | | 7/1996 | Moubayed et al. | 422/101 |
| 5,536,644 | * | 7/1996 | Ullman et al. . | |
| 5,543,289 | * | 8/1996 | Miltenyi . | |

FOREIGN PATENT DOCUMENTS

| | | | |
|---|---|---|---|
| 0 589 636 | | 3/1994 | (EP) . |
| 92/16301 | * | 10/1992 | (WO) . |
| 94/11078 | * | 5/1994 | (WO) . |
| 96/31776 | * | 10/1996 | (WO) . |
| 97/16835 | | 5/1997 | (WO) . |

OTHER PUBLICATIONS

"Magnetic Materials" McGraw–Hill Encyclopedia of Science & Technology (vol. 10, 7th ed., pp. 294–295).*

(List continued on next page.)

*Primary Examiner*—W. L. Walker
*Assistant Examiner*—Marianne Ocampo
(74) *Attorney, Agent, or Firm*—Pillsbury Winthrop LLP

(57) ABSTRACT

The separation device of the invention is directed to a container having an interior surface defining a channel. The container further has an inlet and an outlet. On the interior surface of the channel are pole tips which may be in a sawtooth configuration having sharp angles facing the interior of the channel that generate a high gradient magnetic field in the channel. Within the channel may be incorporated separating material. The separating material eliminates the direct contact of cells with the magnetic pole material. The separating material, as well as the sawtooth pole tips also serves the purpose of creating a field gradient across the entire container to avoid the problem of zero field gradient in the center of the container where the velocity is greatest, and where more cells flow. The separating material is designed to cause a substantially unobstructed flow of medium through the channel so that unlabeled substances are not trapped in the separating material.

34 Claims, 7 Drawing Sheets

OTHER PUBLICATIONS

"The Gradient" Electromagnetic Fields and Waves (Lorrain et al., 1962, pp. 10–11).*

Fan, Y. et al., "Selection and Purification of CD34+ Cells Using Monoclonal Antibody and Ferrofluids", *Advances in Bone Marrow Purging and Processing: Fourth Int'l Symposium*, pp. 309–315 (1994) Wiley–Liss, Inc.

Liberti, P.A. and Feeley, B.P., "Chapter 17—Analytical– and Process–Scale Cell Separation with Bioreceptor Ferrofluids and High–Gradient Magnetic Separation", *Cell Separation Science and Technology*, pp. 268–291 (1991) American Chemical Society.

Roath, S. et al., "Specific Capture of Targeted Hematopoietic Cells By High Gradient Magnetic Separation By the Use of Ordered Wire Array Filters and Tetrameric Antibody Complexes Linked to a Dextran Iron Particle", *Advances in Bone Marrow Purging and Processing: Fourth Int'l Symposium*, pp. 155–163 (1994) Wiley–Liss, Inc.

Thomas, T.E. and Lansdorp, P.M., "Selective Separation of Cells Using Magnetic Colloids", *Advances in Bone Marrow Purging and Processing: Fourth Int'l Symposium*, pp. 65–77 (1994) Wiley–Liss, Inc.

Shoichi Kimura et al., "Magnetic Filter for Solids: Theory and Experiment", Industrial & Engineering Chemistry Research, vol. 28, No. 6, Jun. 1989, pp. 803–808.

* cited by examiner

HIGH GRADIENT MAGNETIC DEVICE AND METHOD FOR CELL SEPARATION OR PURIFICATION

BACKGROUND OF THE INVENTION

1. Field of the Invention

The present invention is directed to magnetic separation devices and methods of isolating magnetically labeled substances such as cells, organelles, subcellular components or fragments and the like from a non-magnetic medium by means of a high gradient magnetic field.

2. Background

The present invention uses a high gradient magnetic separation technique (HGMS) to remove magnetically charged or labeled substances distinguished from unlabeled substances from media. The present invention has particular utility in the purification of biological materials in the laboratory or in clinical applications. It can be used in either batch or continuous operation and the target substance to be removed may be either labeled substances or unlabeled substances.

HGMS refers to a procedure for selectively retaining magnetic substances or magnetically labeled substances in a channel or column disposed in a magnetic field. Usually, a biological material such as a cell is labeled with a very small magnetic particle. The magnetic particle is attached to a ligand. The ligand-magnetic particle complex then binds to the biological material making it susceptible to attraction by magnets or magnetic material in a HGMS separation device. The magnetically labeled biological substance is typically suspended in a liquid medium that is then placed in a HGMS device.

The labeled substance remains in the device while the liquid and ideally all other substances are expelled. Then the labeled substance can be removed.

HGMS is typically accomplished by using a device having a separation chamber with a mass of steel wool, steel wire or magnetically susceptible beads disposed between the poles of a conventional electro- or superconducting magnet and serves to generate large field gradients around the wire or beads which exert a strong attractive force on target substance-magnetic particle complexes.

Often such steel wool matrix HGMS devices give rise to disadvantages such as a tortuous path causing non-specific trapping of non-target substances. This occurs by virtue of the fact that the packing material has small dimensions to maximize induced field gradients but which trap non-target substances. These non-target substances are difficult to remove from the matrix; hence, these non-target substances are recovered along with the final product, thus decreasing product purity. This trapping also mandates that the internal matrix must be disposed of after each use. These types of HGMS devices also have the problem of direct contact of cells with the magnetic material which causes damage to cellular target substances.

Another type of HGMS device has unobstructed chambers to minimize non-specific entrapment, but require the generation of very high magnetic field gradients in order to capture the target substances. Such high fields and gradients are created by the appropriate design and placement of permanent or electromagnets. However, these open chamber HGMS devices suffer from a problem of zero field gradient in the center of the container and additionally, substantial regions of relatively low gradient where the velocity is greatest, and where more cells flow as described in U.S. Pat. No. 5,466,574.

From the foregoing, it is apparent that the prior HGMS devices and methods are useful but suffer from many problems. Therefore, there is a present need for a HGMS device and method which provides for separation of target substances with a high degree of purity and which will not damage the target substances during operation. The present invention solves the problems of the prior devices and methods by maximizing the magnetic force exerted on a magnetically labeled substance and minimizing the non-specific trapping of unlabeled substances. The presence of the novel segregating material which permits substantially unobstructed flow of medium through the channel and specifically shaped pole tips contribute to a high gradient magnetic field inside the container that minimizes the problem of a zero field gradient in the center of the container. The invention is also easily sterilized and does not trap unlabeled substances due to its flow through construction.

SUMMARY OF THE INVENTION

An object of the present invention is to avoid the problems of the prior devices. The primary consideration behind the design of the present HGMS device and the present method is to maximize the magnetic force exerted on a magnetically labeled substance, such as for example, cells, while minimizing the non-specific trapping of unlabeled substances.

The HGMS device of the present invention comprises a container having an interior surface defining a channel. The container further has an inlet and an outlet. On the interior surface of the channel are pole tips which may be in a sawtooth configuration or a configuration having sharp angles facing the interior of the channel that generate a high gradient magnetic field gradient in the channel. Within the channel may be incorporated separating material. The separating material eliminates the direct contact of cells with the magnetic pole material. The sawtooth pole tips also serve the purpose of assisting in creating a field gradient across the entire container to minimize the problem of zero field gradient in the center of the container where the velocity is greatest, and where more cells flow. The separating material is made of non-magnetic hollow fibers, flat tubes, sheets or other material which provides for a substantially unobstructed flow path of medium through the channel from the inlet to the outlet. Because there is a substantially unobstructed flow of medium through the channel, unlabeled substances are not trapped.

The specially shaped pole tips generate a large magnetic gradient across the entire interior of the container which is required to retain the labeled cells or substances in the device, while the unlabeled substances flow through.

In operation, magnetically labeled substances in a liquid medium are passed through the device and are subjected to a continuous high gradient magnetic field wherein no substantial volume of zero field gradient exists to remove the labeled substance from the medium. The inventive device can, by virtue of its superior magnetic attraction, retain the specifically labeled magnetic substances while unlabeled cells and liquid medium flow through. The labeled cells can then be released and collected by removing or decreasing the magnetic field.

From the foregoing summary, it will be appreciated that the present invention provides a separation device and methods of simple construction and operation which enable the efficient, safe separation with a high level of purification of labeled substances coupled with magnetic particles from a medium.

DETAILED DESCRIPTION OF THE PREFERRED EMBODIMENTS

The preferred embodiments of the present invention and methods will now be described in detail with reference to the drawings.

Figure 1:
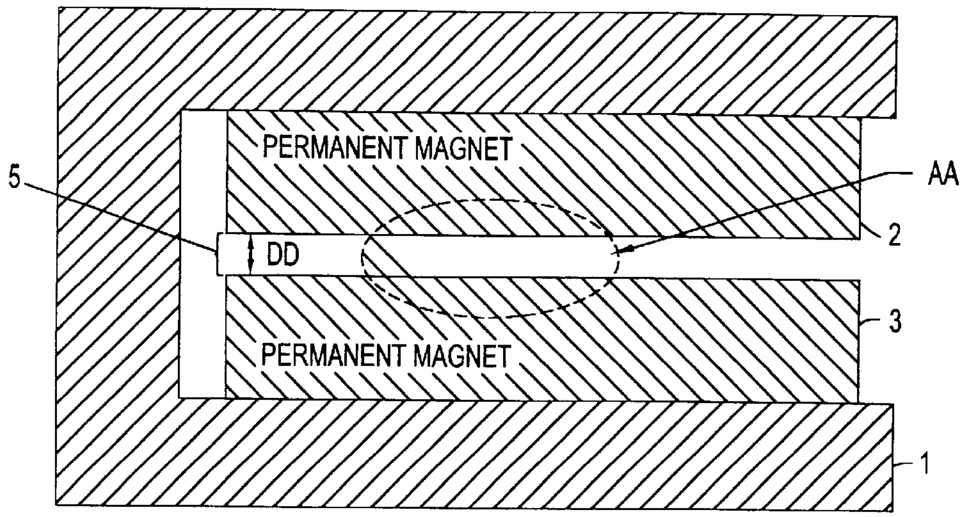
FIG. 1 is a schematic diagram of a magnetic separation device embodying a first embodiment of the present invention.
Figure 2:
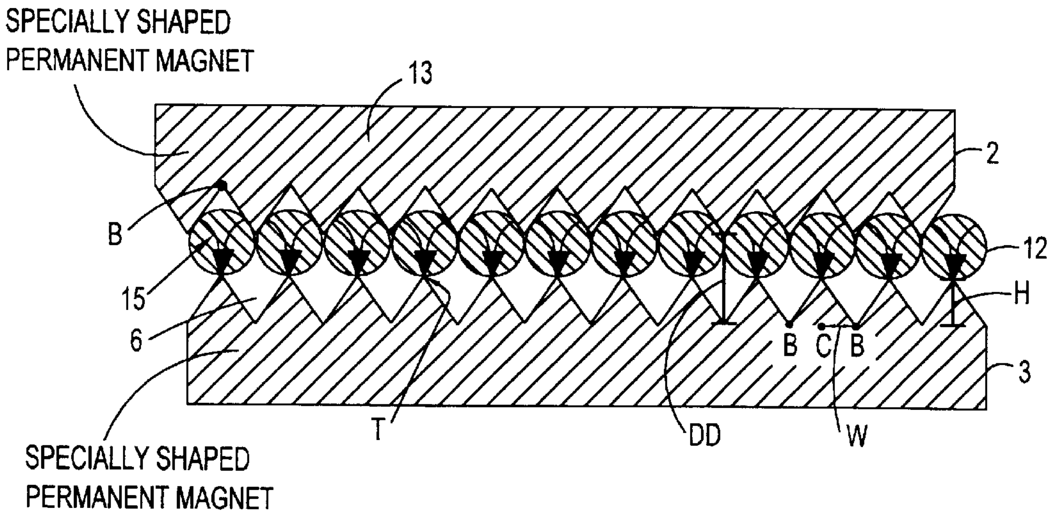
FIG. 2 is an enlargement of the pole tip area AA of FIG. 1.
Figure 2A:
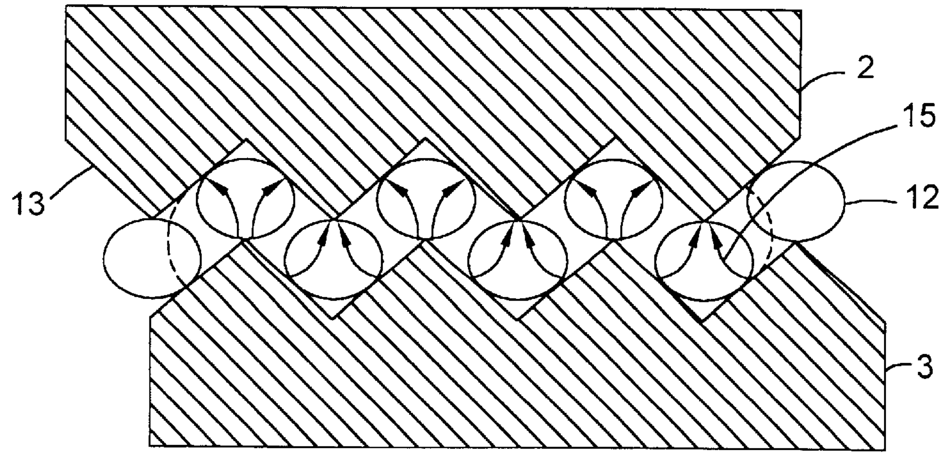
FIG. 2A is an alternate enlargement of the pole tip area AA of FIG. 1.
Figure 2B:
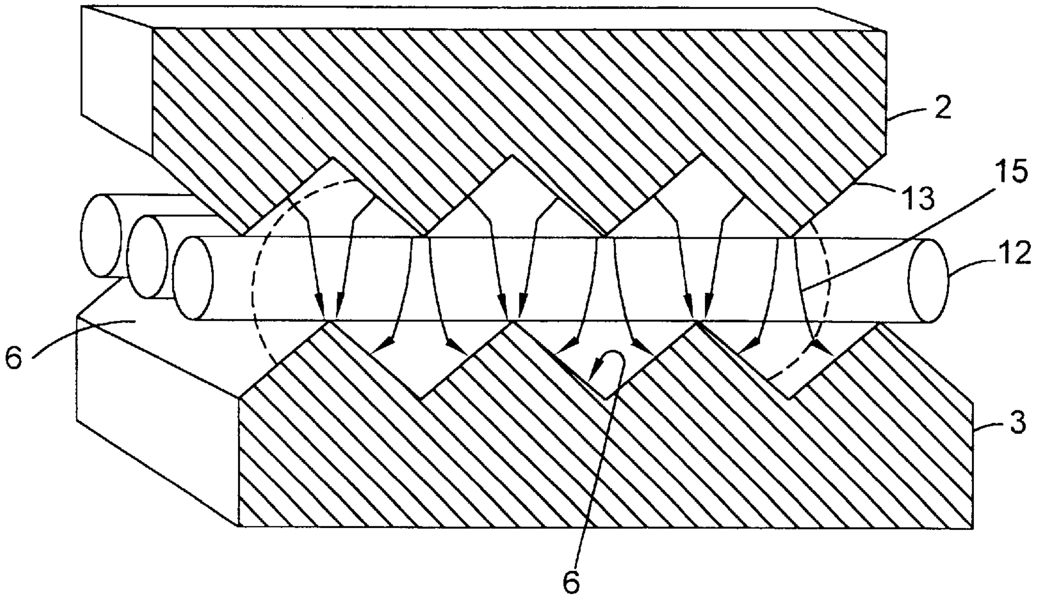
FIG. 2B is an alternate enlargement of the pole tip area AA of FIG. 1, showing hollow fibers perpendicular to the grooves.

The device of the present invention includes a suitable structure for establishing appropriate magnetic fields for the separation of a magnetically labeled substance from a medium. In particular, the device as shown in FIG. 1 is made of an iron yoke 1 which is provided for flux return. Inside the iron yoke are opposing permanent magnets 2 and 3 separated by a distance DD defining a channel 5 there-between. FIGS. 2, 2A, and 2B show enlargements of the area AA of FIG. 1. Permanent magnets 2 and 3 are shaped in a generally sawtooth configuration (a sawtooth can be machined in magnets or a machined pole tip may be placed on a flat magnet) and are spaced apart by a distance DD which defines the channel width. A channel 5 is defined as the space between the two magnets 2 and 3. Each tooth 13 of the sawtooth magnet has a height H and a width W. Each tooth has two base points B and a tip T. The width W of a tooth is substantially equal to the distance from one base point of a tooth to the center C of a tooth. In the channel 5 between magnets 2 and 3 are situated separating material 12 comprising hollow fibers. Liquid medium passes through the separating material which prevents the contents of the medium from making direct contact with the magnets. In FIG. 2, the arrow 15 indicates a north/south direction of the magnetic field. For FIGS. 2, 2A and 2B, the magnetic field may be created with a north/south magnet configuration or same pole configuration such as, for example a north/north magnet configuration.

FIGS. 2 and 2A show embodiments where the separating material is parallel to the grooves 6. FIG. 2B shows an embodiment where the separating material is perpendicular or across the grooves 6.

Figure 3:
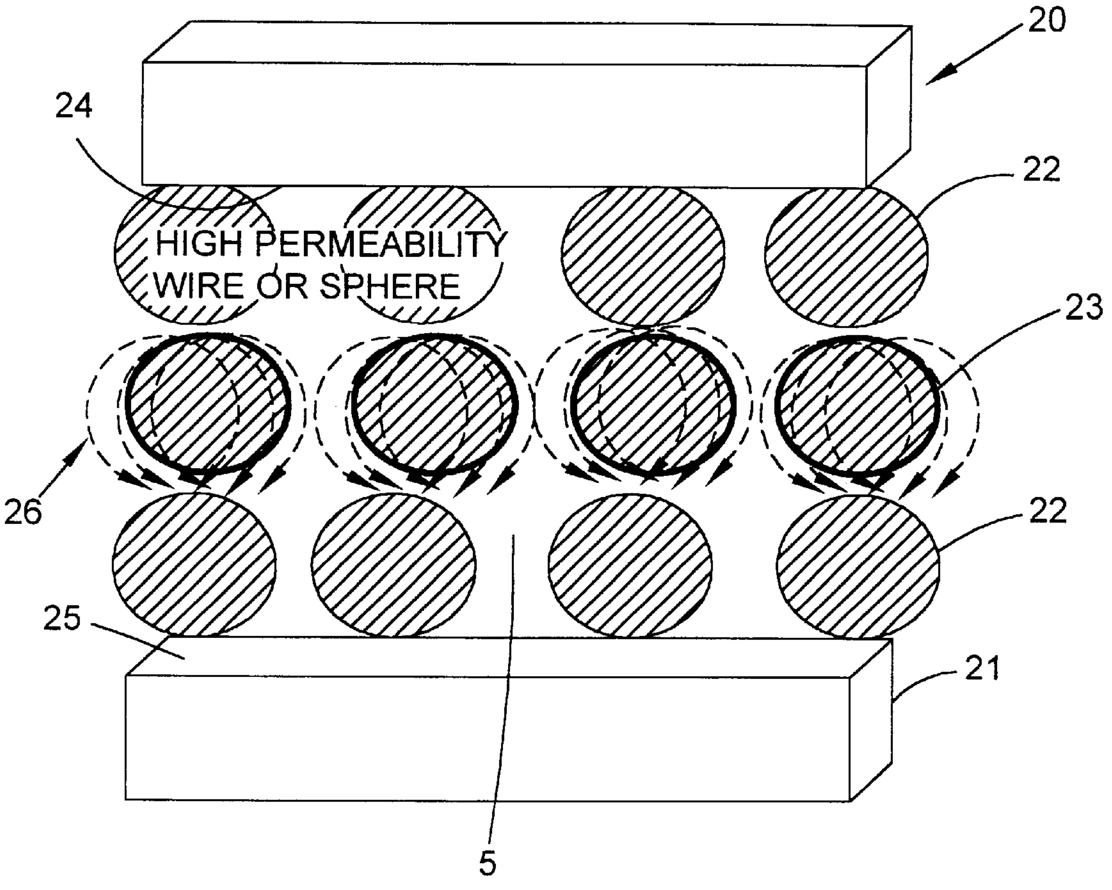
FIG. 3; is a schematic diagram of a magnetic separation device embodying a second embodiment of the present invention.

FIG. 3 shows the device of the invention according to a third embodiment of the invention. Permanent magnets 20 and 21 have channel facing surfaces 24 and 25 defining channel 5. Attached to the channel facing surfaces 24 and 25 are pole tips 22. The pole tips 22 are in the shape of spheres and are permanently or removably attached or integral to their respective channel facing surface of the respective permanent magnets. Alternatively, the pole tips 22 may be wires. In the channel 5 between pole tips 22 are situated hollow fibers 23. The hollow fibers 23 function as separating material. The medium flows through the hollow fibers during the separation process. Circular arrows 26 indicate the direction of the magnetic field created by the permanent magnets and pole tips, with a north/south magnet configuration. Same-pole configurations may be used, such as, for example, a north/north magnetic configuration.

Figure 4:
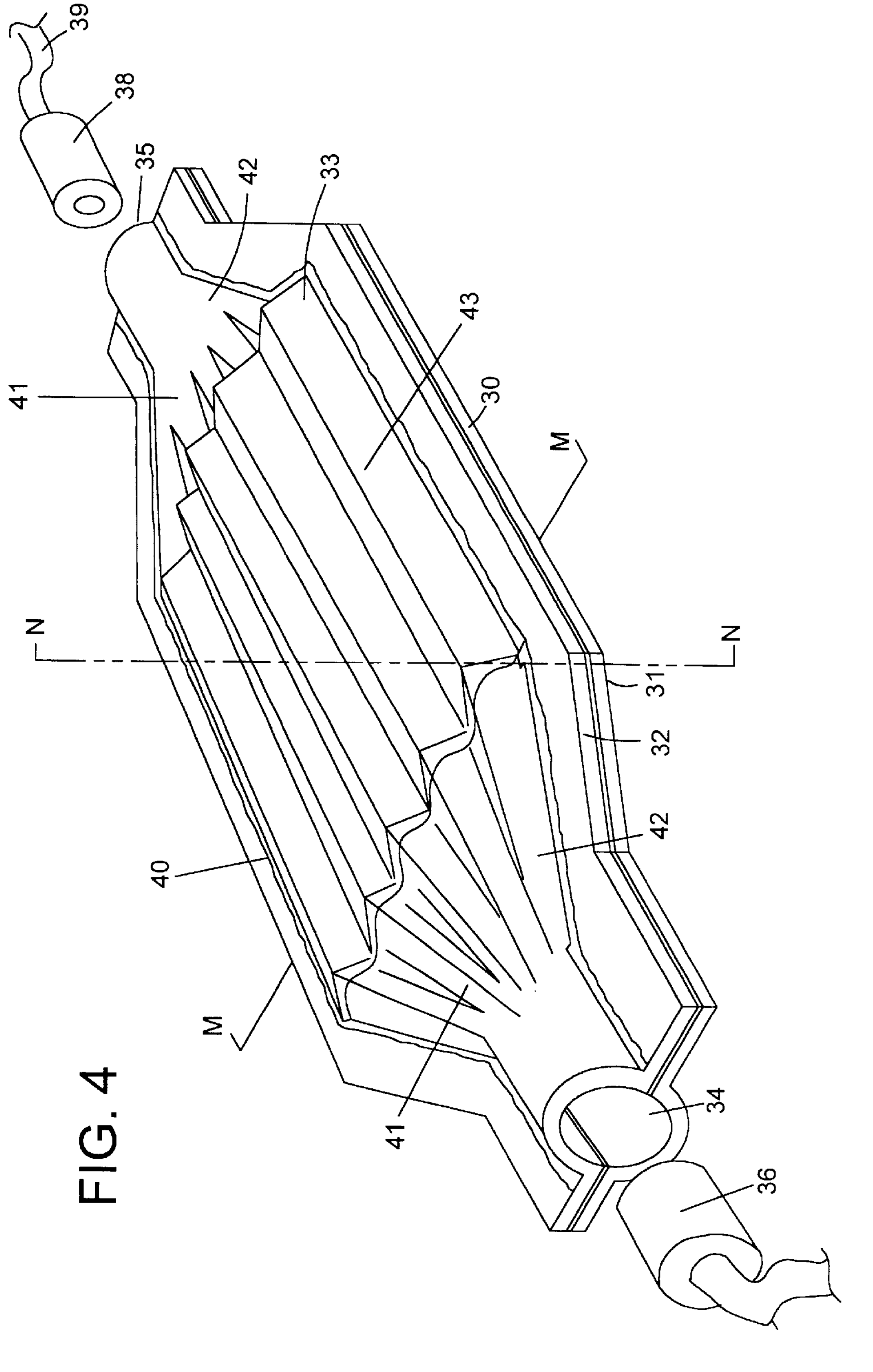
FIG. 4 is a schematic diagram of a separation material cartridge of a magnetic separation device embodying a third embodiment of the present invention.

FIG. 4 is a fourth embodiment of the invention showing separating material cartridge 30 in the form of opposing non-magnetic sheets 31 and 32 attached together by a seal 40, such as a heat seal, which provides fluid path integrity. The sheets 31 and 32 are formed generally in a sawtooth configuration 33, complimentary in shape to conform very closely to the sawtooth pole tip magnetic surfaces which they would cover. At opposite ends of the separating material cartridge 30 are funnel portions 42 that narrow the sheets 31 and 32 from the main body 43 to an inlet 34 and an outlet 35, respectively. Within the funnel portions 42 are capillaries 41 that meter fluid evenly from the inlet 34 to the main body 43 and from the main body 43 to the outlet 35. The purpose of a wide main body is to provide a greater surface area for separation. Appropriate tubing 37, such as biological tubing, for feeding the medium to the cartridge 30 is connected to the cartridge by a fitting 36. A fitting 38 connects the separating material cartridge to tubing 39 to allow medium to exit the separating material cartridge. The segregating material cartridge 30 prevents medium and the labeled cells therein from directly contacting the sawtooth magnets and becoming damaged during the separation process.

Figure 5:
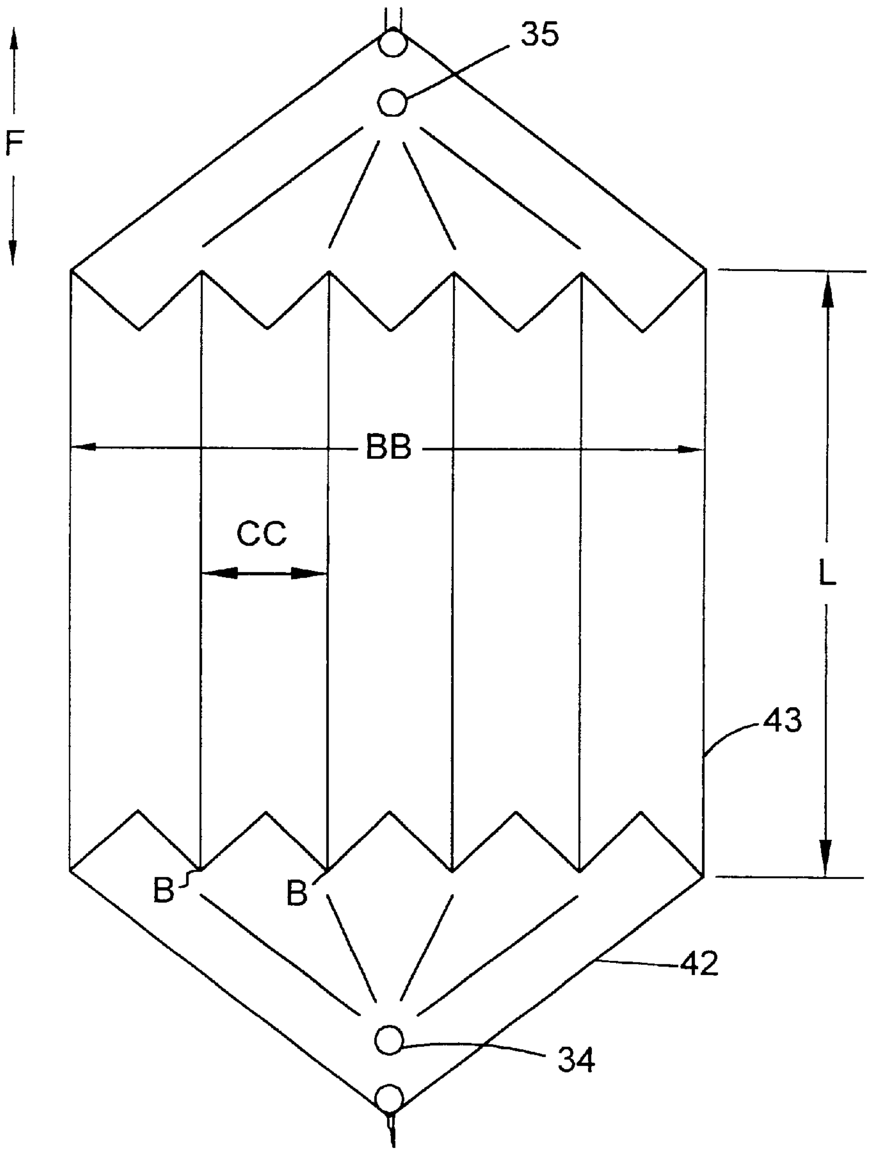
FIG. 5 is a cross-sectional view of the cartridge of FIG. 4 along lines M—M.

FIG. 5 shows a cross-section cut through lines M—M of the separating material cartridge 30 of FIG. 4. Since the separating material is complimentary in shape to a sawtooth device, the dimensions thereof are substantially the same and vary depending on the thickness of the segregating material sheets. BB defines the width of the main body 43. L defines the length of the main body 43. CC defines the width from base point B to base point B of one tooth. F defines the length of a funnel portion which is the distance from an inlet 34 or outlet 35 to the main body 43.

Figure 6:
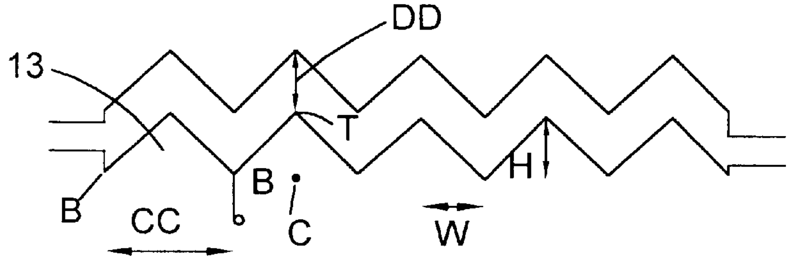
FIG. 6 is a cross-sectional view of the cartridge of FIG. 4 along lines N—N.

FIG. 6 shows a cross-sectional view cut through lines N—N of the segregating material cartridge 30 in FIG. 4. DD is the channel width. CC is the width from base point B to base point B of one tooth 13. W is equal to half of the distance CC or in other words, the distance from base point B to the center point c of the tooth.

The channel facing surfaces of the two magnets are preferably modified to have a generally sawtooth surface shape. However, the pole tips may be in the shape of rectangular ridges and corresponding grooves, spheres or wires, triangular shaped sawteeth being preferred. All of these shapes are considered to have sharp angles for purposes of this invention. The magnetic pole tips generate a high gradient magnetic field within the channel. A configuration with sharp angles, such as the depicted sawtooth configuration is very important and is chosen to reduce or eliminate the zero field gradient volume in the center of the container and to intensify field gradients. The pole tips comprise two permanent or electromagnets spaced a determined distance apart. The spacing between the magnets is fixed and defines the channel width DD. The spacing of the magnets affects the field gradient. The average field gradient is a function of this spacing. As the magnets are placed further apart, the field gradient dies off very quickly. For most effective separation, the magnets should be placed closely together (i.e. narrow channel widths) to generate maximal field gradients. The typical range for channel widths is between about 0.05 mm and about 10 mm and preferably about 2 mm.

The length of the channel depends on the residence time of the target cells. Some of the factors that are to be taken into consideration are antigen density, cell concentration, volume of starting materials, flow speed, channel width, gradient strength, and magnetic labeling efficiency. For hematopoietic stem and progenitor cell separation, a clinical device for the capture of about $10^9$ cells would contain about 50–500 square centimeters of surface area.

The tooth angle and the tooth height of the sawteeth are varied to affect the magnetic field gradient. The height H of a sawtooth can be varied as a percentage of the magnet spacing (gap between magnets). As the height of the tooth increases and approaches the inter-magnet spacing the field gradient increases. For tooth height greater than 50% of the inter-magnet spacing, the field gradient plateaus out at a maximum. The tooth height H is preferably equal to the channel width DD and the width of the tooth W is equal to the channel width DD. The preferred angle of the tooth is between 60 and 120 degrees. A more preferred angle is 90 degrees.

Separating Material

The magnetic pole tips are preferably not in direct contact with the channel but separated therefrom by hollow fibers, flat tubes, a non-magnetic sheet or plastic coating, However, the use of separating material in this invention is optional, although preferred. By using separating material, cell-magnet contact is prevented. This facilitates easy recovery of cells, ease of sterilization, reduction in non-specific binding, and increased cell viability. (Direct contact of the medium with the magnetic pole tips can cause damage to sensitive biological material. Also, contact with cells will require disposal of the magnets after a single use in a therapeutic setting. Also, contact with aqueous solutions on a continuing basis may damage the magnets.)

The separating material also provides a generally straight or unobstructed flow-through channel that avoids undesired and indiscriminate cell trapping.

The separating material also facilitates sterilization of the device. The separating material can be single use/disposable or may be cleaned and reused. In the clinical context, a worker would simply install a sterilized disposable cartridge of separating sheets or hollow fibers or the like in the device before each patient's cells are introduced.

The separating material is made out of a non-magnetic material and should exhibit low non-specific binding characteristics for the medium and unlabeled substances to be manipulated. Plastics work well as separating material and especially preferred are polycarbonates. Also polyethylene, HDPE, polystyrene, polypropylene, PVC and PETG are useful. Aluminum or titanium stampings are examples of non-magnetic metals that are suitable. The separating material may be made by thermoforming, injection molding or stamping (for metals) or any other suitable process.

If hollow fibers or tubes are used as the separating material, they are held in place by the saw-teeth on opposite sides of the channel. The outer diameter of an individual hollow fiber or flat tube is selected to equal the optimum separation of teeth for the highest gradient consistent with fluid flow requirements, and is preferably equal to the channel width DD. The hollow fibers or flat tubes may run up to the entire length of the channel for the highest efficiency and to maximize the selection surface. It is also possible to extend the hollow fibers or tubes beyond the inlet and outlet ports to stabilize the flow of medium prior to entering the device. Sterilization of the hollow fibers or tubes is accomplished by gamma irradiation or electron beam irradiation. Other sterilization methods could be used such as steam sterilization or the introduction of a gas such as ethylene oxide.

If the separating material is made out of non-magnetic sheets, the sheets may be thermoformed, injection molded or made by any other suitable process. The sheets are formed to match the contour of the magnetic surfaces. The range of thickness of the sheet is usually from about 0.05 mm to about 0.5 mm and about 0.25 mm is preferred. To further reduce non-specific binding, a coating may be applied to the sheet such as silicone or albumin.

The saw-tooth device of the invention can generate fields of about 12,000 Gauss, and gradients of about 15,000 Gauss/cm (inter-magnet spacing of about 5 mm, tooth dimension of about 2 mm, magnetic pole-tip strength of about 12.3 kG). Overall, the magnetic forces generated by the saw-tooth device of the invention are about 20–500 times that achieved in the prior devices. Such forces are necessary and beneficial when selecting cells with low antigen densities (e.g., Thy-1) and consequently low nanoparticle content (low $\phi_m$).

Magnetic Capture

As a magnetic particle (e.g. cell tagged with magnetic nanoparticle) passes through a magnetic field, it experiences a magnetic force that draws it towards the magnetic pole-tip. This force is a function of (a) how magnetizable the particle is, and (b) the local field gradient where the particle is located.

$$\vec{F}_m=(\vec{M}\cdot\vec{\nabla})\vec{B} \quad [1]$$

$\vec{M}$ is the magnetization of the particle, $\vec{B}$ is the magnetic field, and $\vec{F}_m$ is the force on the particle.

$\vec{\nabla}$ is the differential operator.

For a saturated magnetic material (valid assumption at very high magnetic fields), the magnetization is of constant magnitude ($|M_s|$) , and the magnetic force is given by Equation 2 below.

$$\vec{F}_m = |M_s| \frac{(\vec{B}\cdot\vec{\nabla})}{|\vec{B}|} \vec{B} \quad [2]$$

For a superparamagnetic material the magnetization is proportional to the applied field, and the magnetic force is given by Equation 3.

$$\vec{F}_m = \frac{\mu}{\mu_o} (\vec{B}\cdot\vec{\nabla})\vec{B} \quad [3]$$

where $\mu$ is the dimensionless magnetic permeability (3.3 for magnetite) and $\mu_o$ is the permeability of air $\overline{\overline{A}}$ $1.26\times10^{-6}$ M/amp$^2$.

When the tagged cell experiences a magnetic force, it accelerates towards the pole-tip. Simultaneously it experiences a hydrodynamic drag force that causes it to decelerate until the two forces equal each other. At this point the cell moves towards the pole-tip at a constant velocity, $\vec{v}$. The drag force, which equals the magnetic force, is given by Equation 4.

$$\vec{F}_D = \frac{18\mu\vec{v}}{D_C^2} \quad [4]$$

Given that the magnetic force on the cell is $\phi_m F_m$, where $\phi_m$ is the volume fraction of magnetic material in the cell-nanoparticle complex, the $F_m$ is the magnetic force that would act on pure magnetic material, when $F_D=\phi_m F_m$, the final velocity of the cell is given by Equation 5.

$$\vec{v} = \frac{\phi_m \vec{F}_m D_C^2}{18\mu} \quad [5]$$

The time that it takes the cell to reach the channel wall (on a path of constant gradient) is given by: t=L/v where L is the distance from the initial location of the cell to the channel wall and v is given by Equation 5. The first criterion for cell capture is that this time t is less than the residence time of the cell in the flow-through channel.

The second criterion for cell capture is that the magnetic force holding the cell at the channel wall is greater than the shear force that tends to pull the cell away with the flow.

Magnetic Material for Substance Separation

Magnetic particles are bound to a ligand that is specific for a marker on a target cell. The ligand is then bound to a particular cell to form a complex that is capable of being separated out of a medium by the magnetic separation device of the present invention. Examples of magnetic particles are magnetite and $Fe_3O_4$. The magnetic particles range from nanoparticles (NPs) of approximately 10 nm to 200 nm in diameter, to macroparticles up to 1 mm in diameter. Preferred particles are less than 200 nm in diameter. Examples of 40 nm dextran-coated NPs are disclosed in U.S. Pat. No. 5,543,289. Examples of dextran or BSA coated NPs ranging in size from 50 nm to 200 nm are disclosed in U.S. Pat. No. 5,512,332. Examples of polymer coated magnetic particles in the range of 50 nm–200 nm are disclosed in U.S. Pat. No. 4,795,698. A preferred nanoparticle is commercially available from Immunicon (Huntingdon Valley, Pa.)

Preferred NPs contain a core of magnetic or equivalent ferromagnetic material of approximately 100–150 nm. The cores are coated with human serum albumin. The final size is approximately 120–160 nm. NPs are passed through a 0.2$\mu$ filter for sterilization. Base NPs are derivatized with streptavidin, an anti-biotin antibody (such as Systemix PR19) or with other haptens, including biotin and biotin-analogs.

Method

A ligand against a substance surface marker attached to submicron superparamagnetic particles is incubated with a mixture of target and non-target substances to allow the binding of the ligand to the surface marker of the desired substance to be separated out of the mixture. The desired substances in a cell mixture to be removed are coupled with the superparamagnetic particles through specific biochemistry in a single or multi-step procedure. An example of this technique is a ferromagnetic particle to which an antibody is bound, which will in turn bind an antigen on a cell. Excess unconjugated nanoparticles may be washed out of the mixture after incubation, if desired.

In operation, the magnetically labeled cells in a liquid medium are exposed to a continuous high gradient magnetic field in the channel of the inventive device. The medium is directed through the channel from an inlet to an outlet. A peristaltic pump or syringe pump is typically used to run the medium through the device. Pole tips in a sawtooth configuration on opposite sides of the channel create the continuous high gradient magnetic field such that a zero magnetic field volume does not exist in the channel. The magnetically labeled cells are retained in the high gradient magnetic field and the remaining liquid medium and all other non-labeled substances are allowed to flow through and out of the device. The separated magnetically labeled cells are then released from the device. The device may also contain separating material that prevents the cells from directly contacting the magnetic material and which aids in removal and sterilization of the device.

The device may be oriented horizontally during operation, but a vertical orientation is preferred. The device may be a continuous operation device wherein continuous operation can be performed by recirculating the medium through the same channel or through additional channels in a multiple channel arrangement in the same device or multiple devices.

The labeled substances or cells are removed from the device by removing the separating material from the device or by removing the magnets. It is preferred to simply remove the magnets. If it is desired to then remove the magnetic particles from the cells, one may use a reagent which frees the cell and derivatized ligand from the NP, or cleaves the cell surface receptor. For the former, see PCT/US96/03267 for the use of dextranase to free bound cells from dextran coated superparamagnetic particles. For the latter, see U.S. Pat. No. 5,081,030 for the use of chymopapain to cleave the CD34 cell surface antigen. One may also use very high flow (shear) rates to dislodge cells.

The following examples and comparative examples further describe the invention and its attributes as compared to other HGMS devices. They also contemplate the best mode for carrying out the invention, but are not to be construed as limiting the invention.

EXAMPLES

A high gradient magnetic device of the invention was used having a channel width (gap) of 2 mm, a tooth height of 2 mm, PETG thermoformed plastic channels, Bremag-ion magnets (Magnet Applications, Horsham, Pa.) of 6.8 kG pole-tip strength, a channel volume of 0.5 ml.

Cells labeled with magnetic nanoparticles were loaded into the channel with magnets in place. The loading flow rate was either 0.1 or 0.5 mL/min and the loading was directed vertically down. After loading, buffer was flushed through at the load flow rate for 10–15 min. Then buffer wash rate was increased to 2 ml/min for 2 minutes and then to 5 ml/min for 1 minute to loosen up and wash away non-specifically bound cells. (In the data section these load and wash fractions have been combined and are designated "reject".) Next, the channel was removed from the magnet to loosen all the retained target cells. The channel was washed with buffer (5 mL/min for 2 minutes and then force-washed with 5–6 ml of buffer from syringe) to recover target cells (designated "retained" fraction).

The total starting cells were counted by a cell counter and the phenotype was quantified by flow cytometry. The percentages often do not equal 100% when small numbers of cells are used.

The antibodies that were used were PR18 (anti-CD34) and PR13 (anti-Thy1). The nanoparticles used are commercially available from Immunicon (Huntingdon Valley, Pa.). The cells used were KG1a and Jurkats from cell lines available from ATCC. MPB stands for mobilized peripheral blood from donors treated with G-CSF, then apheresed. Other reagents used were PE (phycoerythrin) as a fluorescent stain for flow cytometry.

Example 1

KG1a-34-Selection

Staining: PR18-Biotin or PR18-unconjugated+SA-np

Flow rate: 0.1 ml/min or 0.5 ml/min for loading.

Magnets placed in north/south configuration.

TABLE 1

| Channel | Antibody | Flow Rate | % in Reject | % in Retained |
|---|---|---|---|---|
| A | PR18 | 0.1 ml/min | 60.0% | 2.6% |
| D | PR18 | 0.5 ml/min | 54.6% | 1.2% |
| C | PR18-Bio | 0.1 ml/min | 1.8% | 80.0% |
| F | PR18-Bio | 0.5 ml/min | 1.9% | 30.8% |

As shown in Table 1, channels A and D represent non-specific retention of 3% and 1%, respectively. The biotinylated antibody channels (C and D) show good cell retention in the channel with negligible loss (<2%) in the reject stream. Faster load time does not appear to adversely affect cell loss or recovery—the result of interest is the lack of increased loss with faster flow (the percentage in retained figures are not determinative in light of equivalent rejection fractions). Therefore, a load flow-rate of 0.5 mL/min was used in the next experiment with Jurkats.

Example 2

Jurkats—Thy-selection (970404)

Staining: x % PR13-biotin+(100%−x%) PR13-unconj.+ SA-np+optional Bio-np

Load Flow Rate: 0.5 ml/min

Magnets placed in north/south configuration.

TABLE 2

| Channel | PR13-Bio | Bio-np | % in Reject | % in Retained |
|---|---|---|---|---|
| A | 0% | No | 59.8% | 0.4% |
| D | 0% | Yes | 56.5% | 3.0% |
| B | 50% | No | 16.3% | 40.2% |
| E | 50% | Yes | 5.5% | 53.5% |
| C | 100% | No | 7.7% | 53.7% |
| F | 100% | Yes | 3.6% | 45.6% |

As can be seen in Table 2, channels A and D represent non-specific retention of 0.4% and 3%, respectively. The attenuation (100% vs 50% PR13-Biotin) of the antigen density on the Jurkats to mimic human Thy+ cells does appear to show increased yield loss in the reject stream of from 8% to 16% with a single particle—see channels B and C, and from 4% to 6% with dual particles—see channels E and F, as expected. (Thy is a very low density antigen. Thus, modeled selection of Thy+ cells was done by blocking a number of Thy sites with unconjugated anti-Thy PR13 before selecting.) The use of a second magnetic nanoparticle appears to decrease the target cell flow-through (channel E vs B, channel F vs C) while preserving the yield in the 'retained' fraction.

Example 3

Figure 7:
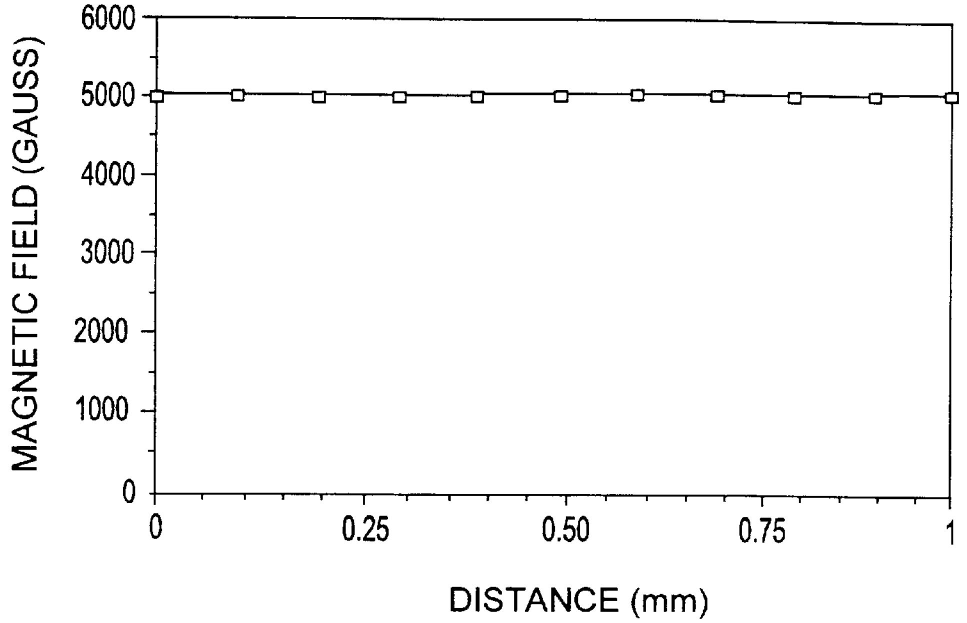
FIG. 7 is a graphic representation of the field in Example 3.

Two flat permanent magnets may be placed N to S, 1 mm apart. In this example, a pole-tip strength of 5 kG is assumed. A graphic representation of the magnetic field is shown in FIG. 7. In this case, the field is completely flat between the two magnets. Due to the absence of field gradients, there is no net force acting on the cells flowing through, hence, no separation.

Example 4

Figure 8:
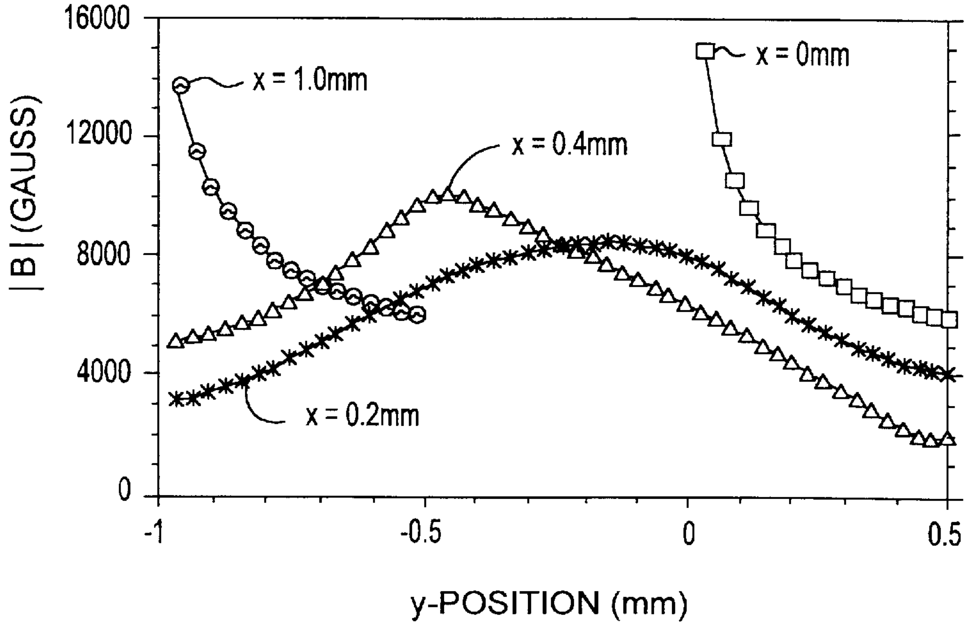
FIG. 8 is a graphic representation of the fields and field gradients of Example 5.

A sawtooth device according to the invention may be used to intensify field gradients. As a first pass, the tooth angle is set at 90 degrees, the tooth height is set at 1 mm and the magnets (12.3 kG pole-tip strength) may be set apart for a channel width of 0.71 mm. A graphic representation of the magnetic fields and field gradients is shown in FIG. 8. The fields are favorable at 4–12 kG as well as field gradients of about 100,000 Gauss/cm. They appear to be much higher than those achieved in the following comparative example and hence, magnetic separation is more effective.

Comparative Example 1

Figure 9:
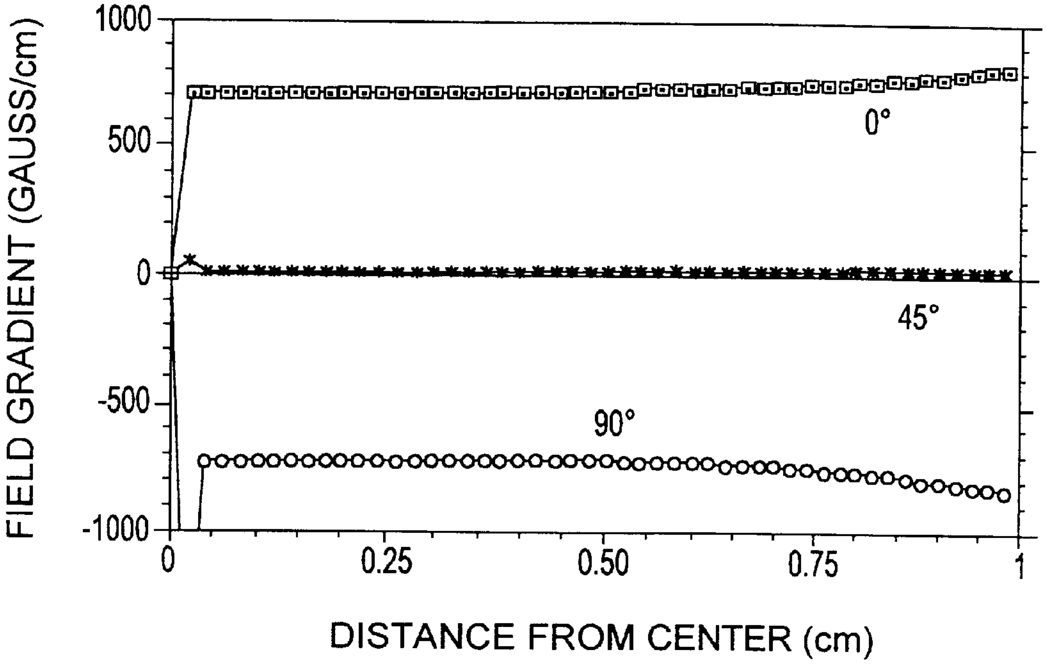
FIG. 9 is a graphic representation of the fields in Comparative Example 1.

This is the device disclosed in U.S. Pat. No. 5,186,827. Four small permanent bar magnets (0.5"×0.5") were placed along the circumference of a cylinder. Each magnet had a pole-tip strength of about 5.5 kG. The outer cylinder (along which the magnets were placed) has a diameter of 5 cm; the inner cylinder (through which the magnets were placed) had a diameter of 5 cm; the inner cylinder (through which the cell suspension flowed) had a diameter of 2 cm. FIG. 9 shows theoretically calculated values of the field gradients at various positions in the device (indicated by the angular position indicated with each profile).

The gradient appears to be uniform. The overall field (not graphed: 0–500 Gauss) and the field gradients (0–700 Gauss/cm) are modest, at best. The resultant forces are inferior to the invention for binding magnetically labeled cells.

All references mentioned hereinabove are incorporated herein by reference in their entirety.

What is claimed is:

1. A separation device for separating magnetically labeled substances from a medium comprising:

a container having an interior channel that permits substantially unobstructed flow of medium therethrough, the container further having an inlet and an outlet; and a high gradient magnetic field producing means comprising magnetic pole tips having sharp angles in a saw-tooth configuration, and the saw-tooth pole tips being arranged asymmetrically on substantially opposite sides of the channel, wherein the saw-tooth pole tips create a continuous magnetic field across the channel such that a zero magnetic field gradient does not exist in the channel.

2. The separation device of claim 1, wherein the channel has a width of about 0.05 to 10 mm.

3. The separation device of claim 1, wherein a height of a tooth of the saw-tooth pole tips is equal to a width of the channel and wherein the width of the channel is equal to one half the distance between lateral base points of the tooth.

4. The separation device of claim 1, wherein the channel is formed of nonmagnetic separating material for separating the medium from the pole tips.

5. The separation device of claim 1, wherein the saw-tooth configuration is an interdigitating saw tooth configuration.

6. A separation device for separating magnetically labeled substances from a medium comprising:

a container having a flow channel that permits substantially unobstructed flow of medium therethrough, the container further having an inlet and an outlet;

a high gradient magnetic field producing means comprising magnetic pole tips having sharp angles in a saw-tooth configuration, and the saw-tooth pole tips being arranged asymmetrically on substantially opposite sides of the channel, wherein the saw-tooth pole tips create a continuous magnetic field across the channel such that a zero magnetic field gradient does not exist in the channel; and nonmagnetic separating material for separating the saw-tooth pole tips from the medium.

7. The separation device of claim 6, wherein the separating material comprises one or more hollow fibers.

8. The separation device of claim 6, wherein the separating material comprises substantially flat tubes.

9. The separation device of claims 7 or 8, wherein between adjacent pole tips are grooves and said separating material is oriented parallel to said grooves.

10. The separation device of claims 7 or 8, wherein between adjacent pole tips are grooves and said separating material is oriented perpendicular to said grooves.

11. The separation device of claim 6, wherein the separating material is in the form of sheets complimentary in shape to the pole tips.

12. The separation device of claim 6, wherein the separating material is removable from the device.

13. The separation device of claim 6, wherein the nonmagnetic separating material provides a substantially unobstructed flow of the medium through the channel.

14. The separation device of claim 6, wherein the pole tips are two generally linear magnets each having a channel facing surface that is three-dimensional.

15. The separation device of claim 6, wherein the device is a continuous operation device.

16. The separation device of claim 6, wherein the magnetic pole tips are external to the channel.

17. The separation device of claim 7, wherein the saw-tooth configuration is an interdigitating saw-tooth configuration.

18. A method for separating magnetically labeled substances from a medium comprising:

introducing a medium of magnetically labeled substances and unlabeled substances to a container having an interior channel that permits substantially unobstructed flow of medium therethrough;

exposing the medium of magnetically labeled substances and unlabeled substances to a high gradient magnetic field in the channel, the channel having sharply angled pole tips, in a saw-tooth configuration, arranged asymmetrically on substantially opposite sides of the channel, the saw-tooth pole tips creating the high gradient magnetic field; wherein the saw-tooth pole tips create a continuous magnetic field across the channel such that a zero magnetic field gradient does not exist in the channel;

retaining magnetically labeled substances in the high gradient magnetic field; and removing substantially all unlabeled substances from the channel with the medium.

19. The method of claim 18, comprising a further step of releasing the labeled substances from the channel.

20. The method of claim 18, wherein the medium is exposed to said magnetic gradient by passing the medium through the channel.

21. The method of claim 18, wherein the magnetically labeled substances are biological substances.

22. The method of claim 18, wherein the labeled substances are released from the channel by removing the magnetic gradient.

23. The method of claim 18, wherein the labeled substances are released from the channel by removing the channel from the device and washing the labeled substances from the channel.

24. The method of claim 18, wherein the channel is formed of nonmagnetic separating material for separating the medium from the pole tips.

25. The method of claim 18, wherein the separating material is hollow fibers or flat tubes.

26. A method for separating magnetically labeled substances from a medium comprising:

passing a medium of magnetically labeled substances and unlabeled substances through a high gradient magnetic field in a substantially unobstructed channel, the channel having sharply angled pole tips, in a saw-tooth configuration, arranged asymmetrically on substantially opposite sides of the channel, the saw-tooth pole tips creating the high gradient magnetic field, the channel formed of separating material for separating the medium from the pole tips, wherein the saw-tooth pole tips create a continuous magnetic field across the channel such that a zero magnetic field gradient does not exist in the channel;

retaining magnetically labeled substances in the high gradient magnetic field; and removing substantially all unlabeled substances from the channel with the medium.

27. The method of claim 26, wherein the magnetically labeled substances are cells.

28. The method of claim 27, wherein the cells are $CD34^+$.

29. The method of claim 27, wherein the cells are $Thy^+$.

30. The method of claim 26, wherein the separating material is arranged to provide a substantially unobstructed flow of the medium through the channel with substantially no trapping of unlabeled substances.

31. The method of claim 26, further comprising the step of releasing the labeled substances from the channel.

32. The method of claim 26, further comprising the step of removing the separating material from the device after removing the unlabeled substances.

33. The method of claim 26, wherein the separating material is one or more plastic sheets complimentary in shape to the pole tips.

34. The method of claim 26, wherein the separating material is flat tubes or hollow fiber.

* * * * *